United States Patent Office 2,820,019
Patented Jan. 14, 1958

2,820,019

PROCESS FOR PREPARING A CONCENTRATED ORGANIC COLLOIDAL POLYMERIC CHLOROTRIFLUOROETHYLENE SUSPENSION

John Walker Eustance, Schenectady, N. Y., assignor to General Electric Company, a corporation of New York No Drawing. Application June 5, 1953
Serial No. 359,961

14 Claims. (Cl. 260—34.2)

This invention is concerned with suspensions of polymeric chlorotrifluoroethylene. More particularly, the invention relates to suspensions comprising (1) a dispersed phase of polymeric chlorotrifluoroethylene particles suspended in (2) a dispersing medium comprising an organic liquid, useful for suspension coating.

Polymeric chlorotrifluoroethylene has been found to have good heat resistance and chemical resistance and because of this is eminently suitable for many applications where such properties are desired. Electrical conductors insulated with polymeric chlorotrifluoroethylene are capable of withstanding temperatures of the order of about 150 to 200° C. for long periods of time with little change in the physical characteristics or the insulating properties of the polymeric insulation. Such polymeric material is also highly desired for many applications where its high softening point is an advantage. Thus, it is possible to mold various objects from the polymeric chlorotrifluoroethylene, either with or without fillers, to give useful articles which are dimensionally stable over a wide temperature range.

Because of its extreme chemical resistance, high flow point and substantial insolubility in many of the common organic solvents, great difficulty has been experienced in obtaining the polymeric chlorotrifluoroethylene in usable form whereby it can be employed for coating or impregnating applications. Many attempts have been made to form solutions of the polymeric chlorotrifluoroethylene but these have generally been unsuccessful because the limit of solubility of the polymeric chlorotrifluoroethylene in the solvent has been so small as to render it impractical.

I have now discovered that I am able to make suspensions of polymeric chlorotrifluoroethylene (using any solid polymer thereof) whereby it is possible to obtain concentrations of the latter polymer in the suspension in sufficiently large amounts as to make them useful in many coating and impregnating applications. By means of my invention, it is possible to obtain suspensions containing higher concentrations of polymer than in heretofore known suspensions.

Unexpectedly, I have now discovered that for the first time it is possible to make substantially stable suspensions of polymeric chlorotrifluoroethylene using as the dispersing medium relatively inexpensive organic liquids. More particularly, I have discovered that I am able to make stable suspensions of polymeric chlorotrifluoroethylene useful for suspension coating by directly transferring polymeric chlorotrifluoroethylene particles from the raw aqueous suspension obtained from emulsion polymerization into dispersing media comprising a large number of organic liquids. In accordance with my invention, transfer of the polymer from aqueous suspension to organic suspension, in a general method, is effected by adding an organic liquid or a mixture of organic liquids, immiscible with water, to an aqueous suspension, adding a small amount of an electrolyte or other flocculating agent, shaking the mixture so as to disperse the two liquid phases and allowing the mixture to stand for a time sufficient for the polymer to transfer to the organic phase in a finely dispersed stable suspension.

Suspensions made in accordance with my above-described methods are uniformly stable over long periods of time. In addition, even if there should be some slight settling out of the suspended polymeric material, it is possible by mere stirring, either prior to use or during use, to reinstate the suspension to its originally acceptable form.

Although some dispersions of the instant polymer and similar polymers such as tetrafluoroethylene, have been made using other methods, no previous method has been completely satisfactory. One method, for example, of applying a coating of polymeric chlorotrifluoroethylene to wire is to lay down a film from a slurry in which the slurrying agents are organic liquids. Such a slurry is usually prepared by either a grinding or ball milling procedure as set forth in United States patent to Sprung, No. 2,581,454, assigned to the assignee of the present invention. Another method of transfer, for example, United States Patent No. 2,510,078 to Perry, involves flocculation of an aqueous suspension of polymer by addition of an electrolyte, for instance, a strong acid, isolation of the polymer by filtration or centrifuging, drying the polymer and resuspension in an organic medium by ball milling or other mechanical dispersing means. However, the mechanical redispersion is a source of undesirable contamination and some degradation of the polymer.

In order more clearly to illustrate my invention, preferred modes of carrying the same into effect and advantageous results obtained thereby, the following examples are given, all parts and percentages being by weight.

*Example 1*

To 20 parts of an aqueous 5.7 weight percent suspension of polymeric chlorotrifluoroethylene were added 3 to 4 parts of n-hexanol. The n-hexanol formed an immiscible layer over the white aqueous suspension. Addition of a few drops of concentrated hydrochloric acid to this two phase system followed by vigorous shaking caused the white color of the aqueous phase to disappear and on settling the polymer had transferred into the organic layer. The resulting organic layer containing the polymer was then more dense than the aqueous layer and settled on the bottom. The aqueous layer was drawn off leaving a more highly concentrated suspension of polymer in n-hexanol than in the original crude aqueous suspension.

A microscopic examination of the organic suspension showed no evidence of increased particle size over that of a raw aqueous suspension.

*Example 2*

Example 1 was repeated using 200 parts of an aqueous polymer suspension of the same concentration but substituting 50 parts of n-butanol for n-hexanol. Upon addition of 0.5 part of concentrated hydrochloric acid to the resulting two phase system followed by agitation, the polymer transferred to the butanol layer and the aqueous layer was decanted leaving the desired concentrated stable organic suspension.

*Example 3*

30 parts of dichlorobenzotrifluoride were added to 200 parts of an aqueous suspension containing approximately 3% polymeric chlorotrifluoroethylene by weight. Upon shaking and addition of 2 parts of concentrated hydrochloric acid the polymer was transferred to the dichlorobenzotrifluoride and was drawn off clearly as an organic suspension.

The resulting approximately 20% solids suspension was used in a dip coating application wherein a layer of fine particle size polymeric chlorotrifluoroethylene was applied and subsequently fused to form a continuous solid film on a metal object.

Example 4

The purpose of this example was to prepare an organic suspension of polymeric trifluoroethylene in a mixture of solvents with a desirable boiling point spread.

500 parts of an aqueous polymer suspension containing approximately 3% by weight of polymer were added to 30 parts of 2-ethylhexanol and 25 parts of tetrachloroethylene. Upon adding 5 parts of concentrated hydrochloric acid and shaking the mixture, the polymer was transferred to the organic phase and was drained off.

To the organic suspension, 5 parts of acetone were added and the mixture agitated in a mechanical blender for 2–3 minutes. Thus, in 20 minutes elapsed time an organic suspension of polymeric chlorotrifluoroethylene suitable for dip coating was produced.

Example 5

(a) To 500 parts of an aqueous ploymer suspension containing approximately 3% by weight of polymer were added approximately 45 parts of a 100 centistoke viscosity silicone oil comprising a polydimethyl-siloxane and stopped with trimethylsiloxy groups (more fully described in Patnode Patent No. 2,469,890, assigned to the assignee of the present invention), and 5 parts of concentrated hydrochloric acid. Transfer of the polymer to the oil was evident. Upon the addition of 45 parts of toluene, a clean separation was accomplished.

(b) Good separation was obtained repeating (a) using toluene but without the silicone oil.

(c) To 1,000 parts of an aqueous suspension containing approximately 3% of chlorotrifluoroethylene polymer by weight were added 45 parts of the silicone oil used in (a) and 45 parts of toluene. The mixture was shaken with 15 parts of concentrated hydrochloric acid to effect transfer and a suspension of fine particle size polymeric chlorotrifluoroethylene in silicone oil-toluene solution resulted. This suspension contained about 25% solids.

Example 6

To 750 parts of 2% solids aqueous suspension of polymeric chlorotrifluoroethylene were added approximately 70 parts of a mixture of equal parts of mono- and dichlorobenzotrifluoride, and 7.5 parts of concentrated hydrochloric acid. The mixture was shaken and allowed to stand whereupon the two liquids separated with the polymer suspended in the organic phase. The organic suspension was drawn off and centrifuged to insure complete removal of water. The suspension was not impaired by this treatment which indicates the fine particle size, stable nature of such a suspension.

In the polymerization of chlorotrifluoroethylene production requirements sometimes require the presence of a wetting agent, which appears in the finished crude, aqueous suspension. Although the presence of a wetting agent is undesirable because it exerts a stabilizing effect, I have found that transfer can still be accomplished by employing additional amounts of coagulant electrolyte to effect transfer.

The following examples illustrate the process of my invention as applied to solutions containing a wetting agent.

Example 7

(a) To 100 parts of an aqueous polymeric chlorotrifluoroethylene suspension containing approximately 1% of a wetting agent were added 20 parts of n-butanol. On shaking, the mixture formed a very fine emulsion which did not readily separate. To 20 parts of this emulsion was added a small quantity of concentrated hydrochloric acid, 0.05 part, and with further shaking a separation of liquids occurred with the polymer appearing entirely in the n-butanol phase.

(b) (a) was repeated without the butanol being present. Coagulation and flocculation of the polymer in the presence of this small amount of wetting agent required much more flocculating agent, approximately 0.3 to 0.5 part of concentrated hydrochloric acid.

Example 8

(a) To 20 parts of an aqueous polymeric chlorotrifluoroethylene suspension containing approximately 0.2 part of a wetting agent were added 20 parts of benzene. Shaking the mixture caused formation of a fairly stable emulsion. The addition of a solution of barium hydroxide, approximately 0.2 part which is in slight excess over the amount of wetting agent present caused the polymer on shaking to enter the benzene phase and that phase to separate.

(b) The same results were obtained when n-hexanol was used as the organic liquid in place of the benzene of (a).

Generally, the organic liquids, used individually or as mixtures, which can be used in the process of my invention must be (1) immiscible with water in the final stage of the transfer in order to effect separation, (2) in the liquid state in the temperature range used for the transfer, and (3) should not be a solvent for the polymer in any appreciable degree in the temperature range employed during the transfer. The concentrations of these organic liquids are such as adequately produce a liquid suspension when all the polymer solids are present in the organic liquid. Thus, transfers in concentrations from 2 to 60 percent solids by weight in organic suspension have been obtained.

In addition to the organic liquids employed in the foregoing examples, numerous other organic liquids can be used. Among additional liquids which I have found eminently suitable may be mentioned methyl chloroform, certain alkylated aromatic hydrocarbons, for instance, pseudocumene, mixed xylenes, mesitylene, t-butylbenzene, beta - methyl - naphthalene, para-t-butyltoluene, alpha-methyl, para-methylstyrene, para-di-t-butylbenzene, naphthalene, etc.

Additional organic liquids which can be used include fluorinated organic compounds having a boiling point above 110° C. and selected from the class consisting of (a) halogenated (e. g., chlorinated, brominated, etc.) derivatives of lower alkyl-substituted (e. g., methyl, ethyl, propyl, isopropyl and butyl) aromatic hydrocarbons containing fluorine (e. g., from 1 to 6 or more fluorines) in the alkyl substituent and (b) fluorinated-chlorinated aliphatic hydrocarbons of the $C_3$ and $C_4$ series containing at least two chlorine atoms (e. g. from 2 to 6). Examples of class (a) include chlorobenzotrifluoride, dichlorobenzotrifluoride, chloro-bis-trifluoromethylbenzene, alpha, alpha-dichloro-beta, beta-difluoroethylbenzene, alpha, alpha-difluoro-alpha - chlorotoluene, orthobromobenzotrifluoride, etc.

Examples of organic liquids falling within group (b) identified above, which can be used include 1-fluoro-2-methyl - 1,1,2 - trichloropropane; 1,1 - difluoro - 2 - methyl 1,2,3,3 - tetrachloropropane; 1,1 - difluoro - 2 - methyl-1,2,3 - trichloropropane; hexachloro - 1,2,3,4 - tetrafluorobutane; 1,1,1,4,4,4 - hexafluoro - tetrachlorobutane; 3-fluoro - pentachloropropene - 1; 3,3 - difluorotetrachloropropene - 1; 1,1 - difluoro - 1,2,2,3,3 - pentachloropropane; 1,3 - difluoro - hexachloropropane; 1,1,2,3 - tetrachloro-2,3,3 - trifluoro - propane; pentachloro - 1,3,3 - trifluoropropane; pentachloro-3,3,3-trifluoropropane; tetrachloro-1,1,3,3-tetrafluoropropane, etc.

Further examples of organic liquids, suitable in this invention, disclosed as solvents for polymeric chlorotrifluoroethylene at elevated temperatures, may be found in Sprung Patent No. 2,581,453, and in the co-pending application of Guenther et al., Serial No. 129,533, filed November 25, 1949, now Patent No. 2,542,070, both assigned to the assignee of the present invention. The disclosure of organic liquids enumerated as solvents in the aforementioned application by reference are made part of the disclosure in the instant application.

The chlorotrifluoroethylene polymers contained in aqueous suspension coming within the scope of my invention are the higher molecular weight solid polymers. Generally, the polymers whose softening points are above 210° C. are found in the aqueous suspensions employed. Such polymers have softening points above 220° C., e. g., from 220° to 270° C. or higher, and under pressure sinter from 220° to 270° C. or higher, and under pressure sinter to clear specimens at 220° to 230° C. Polymers of this description may be prepared in accordance with the process described and claimed in Roedel Patent No. 2,613,202, assigned to the assignee of the present invention. Microscopic examination of latices produced in accordance with the aforementioned patent proved particle size to be of the order of 0.2 micron. In general, the starting crude aqueous latices can range in solids concentration from zero percent to maximum stable suspension including those containing wetting agents.

In addition to concentrated hydrochloric acid and barium hydroxide already described, many other flocculating agents can be used. Generally, the flocculating or coagulating agent can be any agent which will normally flocculate the aqueous suspension and cause the particles to coalesce and settle out of suspension. Any strong electrolyte will suffice. Among additional flocculating agents may be mentioned phosphoric, formic and sulfuric acids and their corresponding salts, for instance, sodium sulfate, potassium nitrate, ammonium chloride, ammonium nitrate and other water-soluble ammonium and alkali metal salts. Other water-soluble alkaline earth and other polyvalent metal salts can also be employed.

Although concentrated solutions of the aforegoing electrolytes are added to the systems, to cause flocculation, the quantity employed is relatively small. Thus, the concentration of electrolyte in the unseparated suspension can be from about 0.05 to 10% or higher, based on the unseparated system.

Temperature ranges suitable for effecting transfer of polymer to an organic suspension in accordance with my invention are those limited by the stability of the suspension, the fluidity of the system, and the solubility of the suspension in the selected organic liquid. Accordingly, the temperature of the starting crude latex should be above 0° C. and below 100° C. or the boiling point or solution temperature of the organic liquids. By solution temperature is meant the temperature at which the organic liquid becomes a solvent for the polymer.

Although my invention has been described primarily in connection with chlorotrifluoroethylene polymers, similar transfer can also be accomplished with stable aqueous suspensions of other polymers obtained by emulsion polymerization, for instance, polytetrafluoroethylene, copolymers of polychlorotrifluoroethylene and polytetrafluoroethylene, latices of butadiene-styrene, polyvinylchloride, etc.

In addition to their use for coating wire and other metal articles, the instant concentrated organic suspensions can be used to coat ceramics, fabrics, wood, cellulose products; to insulate electrical conductors; for coating and impregnating various fillers, such as, for example, glass cloth, glass batting, asbestos cloth, mica, etc. Additionally, the suspensions may be advantageously employed in making molding compositions by adding to the suspensions various inert inorganic fillers to obtain a homogeneous mixture and thereafter removing the liquid dispersing phase therefrom. Laminated products may also be prepared by coating and impregnating sheet material and superimposing layers of the impregnated and coated material and pressing the total assembly under heat and pressure to obtain fusing of the polymer and to give a homogeneous article. In some coating applications, as for instance, in the coating of electrical conductors such as magnet wire, it has been found advantageous to add varying amounts, for example, from 1 to 10 percent, by weight, or more of a finely divided pigment or filler to the suspensions. Among such pigments and fillers are, for example, calcium carbonate, barium sulfate, talc, Muscovite mica, sodium fluorisilicate, calcium fluoride, etc.

What I claim as new and desire to secure by Letters Patent of the United States is:

1. The process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene, adding a strong electrolyte to the resulting two-phase system, agitating said system to flocculate said polychlorotrifluoroethylene and allowing said flocculated polychlorotrifluoroethylene to transfer from the aqueous phase to the organic phase by settling to a form a concentrated organic colloidal suspension.

2. A process for preparing a concentrated organic colloidal polychlorotrifluoroethylene suspension which comprises adding a water-immiscible liquid organic compound which is substantially a non-solvent for the polymer at the temperature of transfer to a dilute aqueous suspension of polychlorotrifluoroethylene having a particle size of the order of 0.2 micron, adding a strong electrolyte to the resulting two-phase liquid system, agitating said liquid system to flocculate said polychlorotrifluoroethylene, allowing transfer of said flocculated polychlorotrifluoroethylene to the organic phase as a colloidal suspension therein by settling and discarding the polychlorotrifluoroethylene-free supernatant aqueous phase.

3. The process set forth in claim 2 in which the liquid organic compound is n-hexanol.

4. The process set forth in claim 2 in which the liquid organic compound is n-butanol.

5. The process set forth in claim 2 in which the liquid organic compound is dichlorobenzotrifluoride.

6. The process set forth in claim 2 in which the liquid organic compound is a mixture of 2-ethylhexanol and tetrachloroethylene.

7. The process set forth in claim 2 in which the liquid organic compound is a dimethyl silicone oil.

8. A process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene having a particle size of the order of 0.2 micron, adding a strong electrolyte to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidal suspension of polychlorotrifluoroethylene having a particle size of the order of 0.2 micron.

9. A process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene, adding a strong mineral acid to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidal suspension of polychlorotrifluoroethylene.

10. A process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene, adding an inorganic base to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidol suspension of polychlorotrifluoroethylene.

11. A process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene having a particle size of the order of 0.2 micron, adding concentrated hydrochloric acid to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidal suspension of polychlorotrifluoroethylene having a particle size of the order of 0.2 micron.

12. The process of claim 11 in which the liquid organic compound is n-hexanol.

13. A process for preparing a concentrated organic colloidal polychlorotrifluoroethylene suspension which comprises adding a water-immiscible organic liquid compound which is substantially a non-solvent for the polymer at the temperature of transfer to a dilute aqueous suspension of polychlorotrifluoroethylene having a particle size of the order of 0.2 micron, adding barium hydroxide to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidal suspension of polychlorotrifluoroethylene having a particle size of the order of 0.2 micron.

14. A process for preparing a concentrated organic colloidal polychlorotrifluoroethylene suspension which comprises adding a water-immiscible organic liquid compound which is substantially a non-solvent for the polymer at the temperature of transfer selected from the group consisting of aliphatic monohydric alcohols, halogenated aliphatic hydrocarbons, halogenated aromatic hydrocarbons, dimethyl silicone oils, aromatic hydrocarbons, alkylated aromatic hydrocarbons and mixtures thereof to a dilute aqueous suspension of polychlorotrifluoroethylene, adding a strong electrolyte to the resulting two-phase system, agitating said system to flocculate said polychlorotrifluoroethylene and allowing said flocculated polychlorotrifluoroethylene to transfer from the aqueous phase to the organic phase by settling to form a concentrated organic colloidal suspension.

References Cited in the file of this patent

UNITED STATES PATENTS

| | | |
|---|---|---|
| 2,460,582 | Japs | Feb. 1, 1949 |
| 2,510,112 | Holbrook | June 6, 1950 |
| 2,542,069 | Young | Feb. 20, 1951 |